US006510366B1

(12) United States Patent
Murray et al.

(10) Patent No.: US 6,510,366 B1
(45) Date of Patent: Jan. 21, 2003

(54) APPARATUS AND METHOD FOR CUSTOMIZING COSMETIC PRODUCTS

(75) Inventors: Liam Anthony Murray, Monroe, CT (US); Michael Statham, Bedford (GB)

(73) Assignee: Elizabeth Arden Company, division of Conopco, Inc., New York, NY (US)

( * ) Notice: Subject to any disclaimer, the term of this patent is extended or adjusted under 35 U.S.C. 154(b) by 0 days.

(21) Appl. No.: 09/496,602

(22) Filed: Feb. 2, 2000

Related U.S. Application Data

(60) Provisional application No. 60/130,742, filed on Apr. 23, 1999.

(51) Int. Cl.[7] .......... G06F 17/00

(52) U.S. Cl. .......... 700/239; 700/233; 700/265; 700/285

(58) Field of Search .......... 700/231, 232, 700/233, 239, 265, 282, 285; 137/3; 222/52

(56) References Cited

U.S. PATENT DOCUMENTS

| | | | | |
|---|---|---|---|---|
| 4,871,262 A | | 10/1989 | Krauss et al. | |
| 4,941,809 A | | 7/1990 | Pinkerton | |
| 5,163,010 A | * | 11/1992 | Klein et al. | 364/479 |
| 5,246,354 A | | 9/1993 | Pardinas | |
| 5,622,692 A | | 4/1997 | Rigg et al. | |
| 5,797,750 A | * | 8/1998 | Gouriou et al. | 434/100 |
| 5,903,465 A | * | 5/1999 | Brown | 364/479.12 |

FOREIGN PATENT DOCUMENTS

| | | |
|---|---|---|
| DE | 41 10 299 | 3/1991 |
| DE | 41 34 882 | 10/1991 |
| EP | 0 443 741 | 8/1991 |
| WO | 95/05891 | 3/1995 |
| WO | 98/30189 | 7/1998 |

* cited by examiner

*Primary Examiner*—Khoi H. Tran

(57) ABSTRACT

An apparatus and method are described for customizing a cosmetic product at the point of sale to a customer. The apparatus includes a program for receiving external information on at least one of the customer's skin properties and converting the information to a corresponding formula. A formulation unit is provided for preparing the corresponding formula. This unit includes a mechanism for receiving the corresponding formula as a set of operating instructions, reservoirs for containing different cosmetic chemical compositions, pumps and a mechanism for activating the pumps to dose the chemical compositions into a common dosing chamber in a manner determined by the operating instructions. Importantly, the pumps must have pistons capable of reciprocating and rotating motion.

9 Claims, 4 Drawing Sheets

APPARATUS AND METHOD FOR CUSTOMIZING COSMETIC PRODUCTS

This application claims the benefit of No. 60/130,742 filed Apr. 23, 1999.

BACKGROUND OF THE INVENTION

1. Field of the Invention

The invention concerns a machine for customizing a cosmetic product at the point of sale to a customer.

2. The Related Art

Not all cosmetic products are universally applicable. Consumers having dry, oily or normal skin may require treatment products especially formulated for their particular condition. Hair products including shampoos, conditioners, hair dyes and permanent wave solutions are all quite sensitive to individual characteristics of the treated hair. No generic formula fits all types. Even more complicated are color cosmetics. A rainbow of shades are necessary to meet public demand. Stores find it a significant problem to stock all possible variations of a particular color cosmetic.

Point of sale cosmetic dispensing machines have been disclosed in the literature and at least one commercially implemented.

EP 0 443 741 A1 (Revlon) discloses a formulation machine for preparing cosmetically functional products. The machine includes a plurality of containers for storing various cosmetic ingredients. An input mechanism is provided for entering into a computer specific criteria representative of a customer's needs. A series of instruction sets are then sent from the computer in response to the specific input criteria to a dispensing mechanism.

U.S. Pat. No. 4,871,262 (Krauss et al.) describes an automatic cosmetic dispensing system for blending selected additives into a cosmetic base. A similar system is described in German Patent 41 10 299 C1 (Erdtmann), with the further element of a facial sensor.

Elizabeth Arden recently commercialized a point of sale system for customizing facial foundation products. The system involves a skin analyzer for reading skin properties, a programmable device receiving the reading and correlating same with a foundation formula, and a formulation machine. Components of the formula held in a series of reservoirs within the machine are dosed into a receiving bottle and blended therein. The system is in use as "Custom Color"™. It is described in U.S. Pat. No. 5,622,692 (Rigg et al.).

"Custom Color"™ suffers from slow dosing speeds and relatively poor precision in the pumping of ingredient streams to form products in receiving vials. Particularly critical are color cosmetic products. Unless precision and clean dispensing occur, shades will not be reproducible.

Accordingly, it is an object of the present invention to provide a method and apparatus for dispensing cosmetic ingredients to form cosmetic products customized at the point of sale in a speedier, more accurate manner.

Another object of the present invention is to provide a method and apparatus for dispensing cosmetic ingredients to form color cosmetic products customized at the point of sale having highly accurate reproducible shades.

These and other objects of the present invention will become more readily apparent through consideration of the following summary, drawing and detailed description which follow.

SUMMARY OF THE INVENTION

An apparatus is described for customizing a cosmetic product at the point of sale to a customer, the apparatus including:

(i) a program for receiving external information on at least one of the customer's skin properties and converting the information to a corresponding formula;

(ii) a formulation unit for preparing the corresponding formula including:

(a) a mechanism for receiving the corresponding formula as a set of operating instructions;

(b) a plurality of reservoirs each containing a different cosmetic chemical composition;

(c) a plurality of pumps, each pump communicating with one of the reservoirs and having a piston operating with reciprocating and rotating motion; and (d) a mechanism for activating the plurality of pumps resulting in dosing to a common dosing chamber of certain of the cosmetic chemical compositions and in certain amounts as determined by the operating instructions.

Also described is a method for customizing a cosmetic product at point of sale to a customer, the method including:

(i) obtaining information on at least one of the customer's skin properties;

(ii) transmitting the information to a program for conversion to a corresponding formula;

(iii) transferring the corresponding formula to a formulation unit for preparing the formula, the unit having a mechanism for converting the corresponding formula into a set of operating instructions, a plurality of reservoirs each containing a different cosmetic chemical composition and a plurality of pumps, each pump communicating with one of the reservoirs and having a piston operating with reciprocating and rotating motion;

(iv) activating the plurality of pumps based on the set of operating instructions to dose certain of the cosmetic chemical compositions in certain amounts as determined by the operating instructions; and (v) receiving the dosed cosmetic chemical compositions in a receiving container.

Pumps suitable in the method and apparatus of this invention advantageously may employ rotating and reciprocating pistons and can operate in reverse to control suck-back. These features optimize droplet size formation at the exit nozzles of the system. Reverse operation of the pump allows purging of air bubbles trapped during reservoir changeovers. Elimination of air bubble pockets insures highly accurate dosing of the chemical compositions. Furthermore, cross contamination of one dose from a precedent dose is minimized by reverse operation drawing off excess precedent dose. Related known customizing apparatuses employ pumps with non-rotating pistons and any reverse mechanisms to allow suck-back are not incorporated within the pump mechanism itself. The prior art pumps are of the diaphragm variety with pull/push mechanisms. The pumps according to the present invention are advantageously displacement pumps which achieve much greater flow.

Another feature of this invention which improves dosing accuracy is use of differential diametered inlet conduits and outlet manifolds. A relatively narrow diameter outlet manifold is attached to the dispensing side of the pump. A larger diameter inlet conduit feeds the intake side. Cavitation is thereby considerably minimized. The smaller sized outlet manifold reduces the liquid speed necessary to cleanly eject the liquid chemical composition.

Still a further feature of the present invention is the use of collapsible containers, particularly pouches, as the reservoirs for the cosmetic chemical compositions. Often constituents of the compositions are air sensitive. These constituents can decompose or even more damaging can be contaminated by microbes. Collapsible containers avoid these problems because they need not be supplied with air vents. By the term collapsible is meant a wall of the container sufficiently flexible to move inward reducing internal volume of the container compensating for any dispensed volume.

DETAILED DESCRIPTION OF THE DRAWING

Features and advantages of the present invention will more fully be appreciated by reference to the drawing in which:

FIG. 3A'–FIG. 3D' are highly schematic cross-sectional views taken along lines 3—3 of FIGS. 3A–3D respectively.

DETAILED DESCRIPTION OF THE INVENTION

Color cosmetic dispensing is a primary although not sole focus of discoveries according to the present invention. Products defined as color cosmetics include facial foundations, lipsticks, hair colorants and nail polish. A more particular focus of the present invention is the delivery of a facial foundation perfectly matched to a customer's complexion. Elizabeth Arden has commercially operated a first generation system known as Custom Color™. Improvements are needed for miniaturizing the apparatus. Certain problems were faced. Droplets of color between dispensing different samples tend to collect at the Custom Color™ outlet nozzles. Relatively large size droplets can cause a significant deviation in achieving reproducibly delivered color shades. According to the present invention it has been discovered that certain types of pumps can minimize droplet formation and their size.

Figure 1:
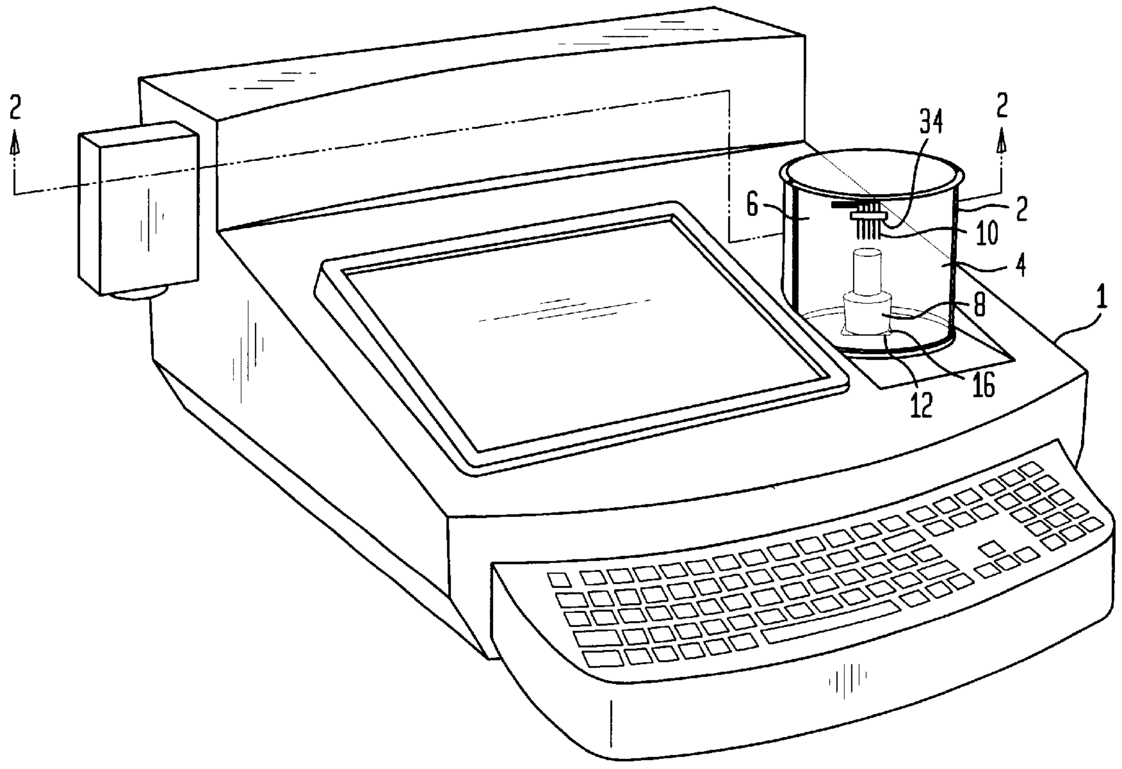
FIG. 1 is a highly schematic perspective view of the apparatus according to the present invention.

FIG. 1 illustrates a typical apparatus for delivering a customized facial foundation at the point of sale. The apparatus includes a housing 1 for a formulation unit and a dispensing/blending cabinet 2 with a transparent door 4 allowing access to a dosing chamber 6. An empty container 8 is positioned to receive various cosmetic chemical compositions from at least one, but generally four or more nozzles 10.

Upon completion of fill into container 8, the fill container is moved to a blending station with a vibrating platform 12 fitted with container holding arms 16 receiving the filled container and agitating the contents to achieve uniform dispersion of all dosed cosmetic chemical compositions. A label is applied to the container thereby identifying the dosed formula corresponding to a customer's measured skin properties. The label may be applied by hand with a coded printout or barcode directed by the logic controller of the apparatus.

Figure 2:
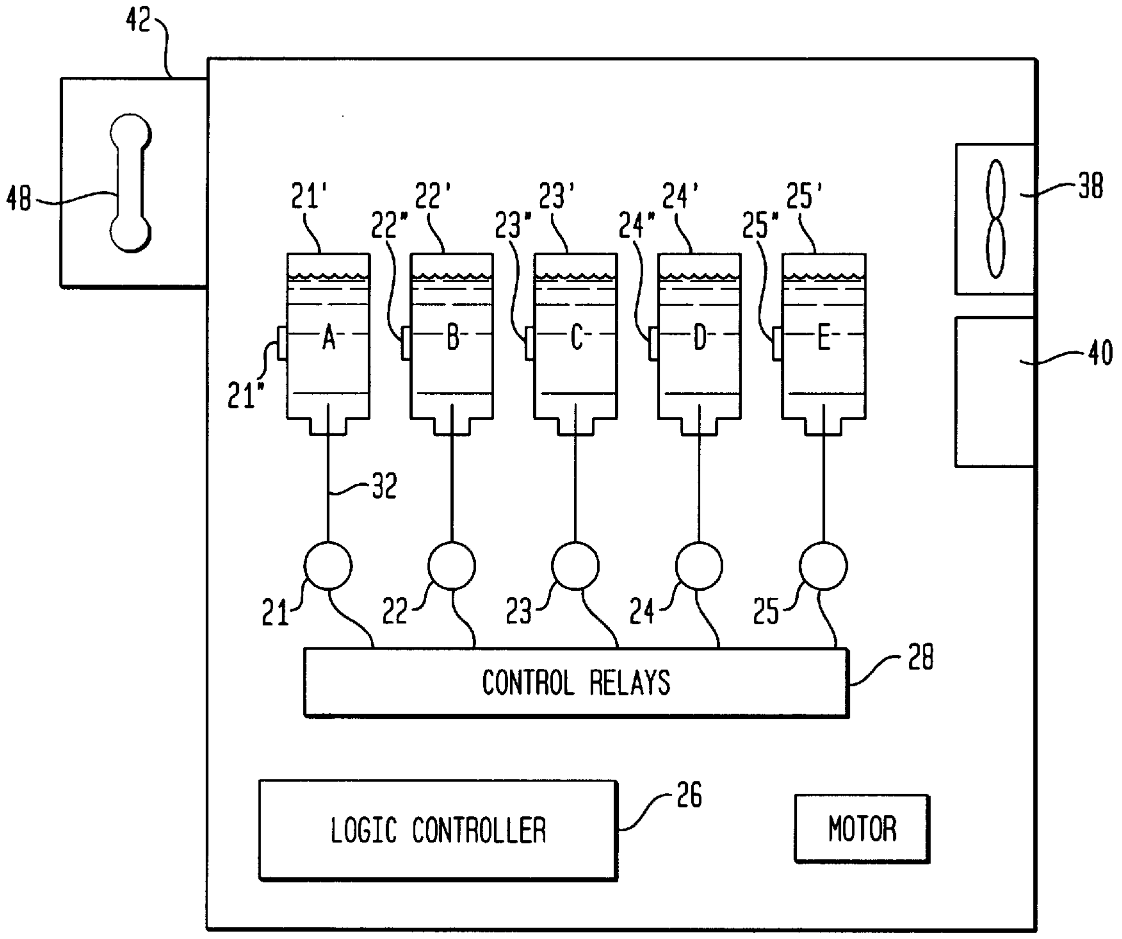
FIG. 2 is a highly schematic cross-sectional plan view of the apparatus taken along line 2—2 of FIG. 1.

FIG. 2 illustrates a cut-away front segment of housing 1. A series of pumps 21–25 are supported in a lower area of the housing. Each of the pumps are fluidly connected to a series of six respective reservoirs identified as reservoirs 21'–25'. Dispensers 21', 22', 23' and 24' hold respectively a white, yellow, red, and black-colored cosmetic chemical composition identified as A, B, C and D. In addition to colorants, the compositions may also include moisturizers, anti-aging agents, anti-oxidants, conditioners, lustre agents, solvents, humectants, surfactants, thickeners and the like. Each reservoir is fluidly connected to a respective pump.

Besides the colored cosmetic compositions, there also is a talc composition E held within dispenser 25' comprising talc and a fluid carrier. Composition E is utilized as a facial coverage modifier and finish adjuster, i.e. matte or dewy finish, for foundation cosmetic products.

Each of the dispensers 21'–25' has an associated liquid level monitor/switch device 21"–25" to identify the amount of cosmetic composition still remaining in the reservoir of the respective dispensers. Level indicator detectors connect to respective liquid level switches 21"–25". These level indicator lights are arranged along a rear wall housing 1. Additionally, the apparatus includes a power switch for electrically energizing the system.

An essential feature of the present invention is the nature of the pumps 20–25. These pumps are valveless, positive displacement metering pumps. They function by the synchronous rotation and reciprocation of a piston in a precisely mated cylinder bore. One pressure and one suction stroke are completed per cycle. A duct (flat portion) on the piston connects a pair of cylinder ports alternately with the pumping chamber, i.e. one port on the pressure portion of the pumping cycle and the other on the suction cycle. The mechanically precise, free of random closure variation valving is performed by the piston duct motion. A pump head module containing the piston and cylinder is mounted in a manner that permits it to be swiveled angularly with respect to the rotating drive member. The degree of angling controls stroke length and in turn flow rate. Pumps of this variety are described in U.S. Pat. Nos. 4,941,809; 5,015,157; 5,020,980; 5,044,889; 5,246,354 and 5,279,210 all to Pinkerton and which are incorporated herein by reference. These pumps are available from Fluid Metering Inc., Syosset, N.Y.

Figure 3A:
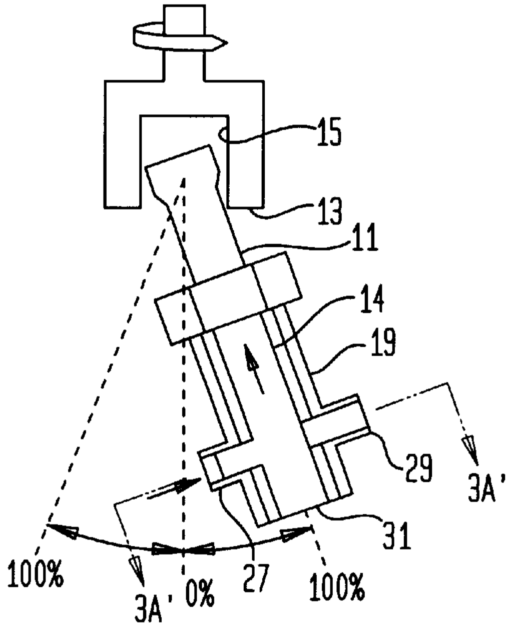
FIG. 3A–FIG. 3D are highly schematic cross-sectional views of the four stroke positions defining one complete piston rotation of a preferred pump embodiment.
Figure 3A:
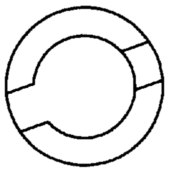

FIG. 3A through FIG. 3D illustrate operation of pumps according to the present invention. FIGS. 3A–D show the functioning of a Fluid Metering Inc. valveless pump across four positions of operation in one complete piston revolution. FIG. 3A is the suction stroke. Piston/cylinder assembly includes a rotary drive shaft 11 secured to a yoke 13 forming a socket 15 of a universal ball/socket bearing. Within the bearing is a ball 17 slidably mounted on an arm projecting laterally from, and secured to, a piston 14 which is reciprocally and rotatably mounted in a cylinder 19. The circular path of the single point universal coupling 15/17 is the power path which drives rotation and stroke action of piston 14. Cylinder 19 is provided with two ports 27 and 29 which operate as inlet or outlet ports depending on the direction of flow selected by angular displacement of the system.

Figure 3B:
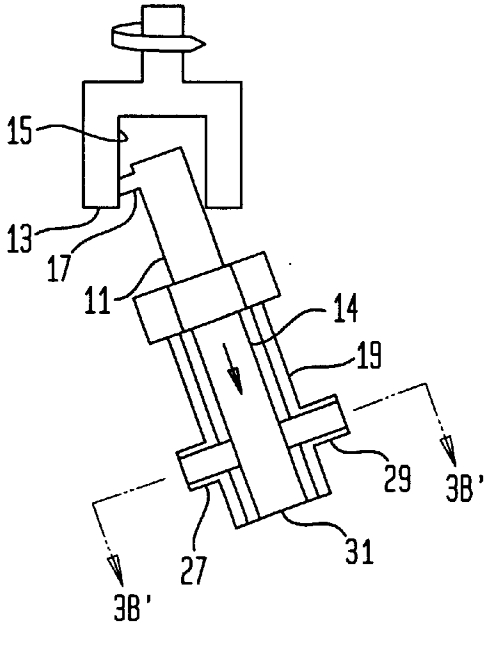
Figure 3B:
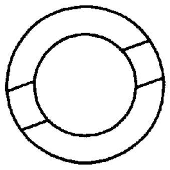
Figure 3C:
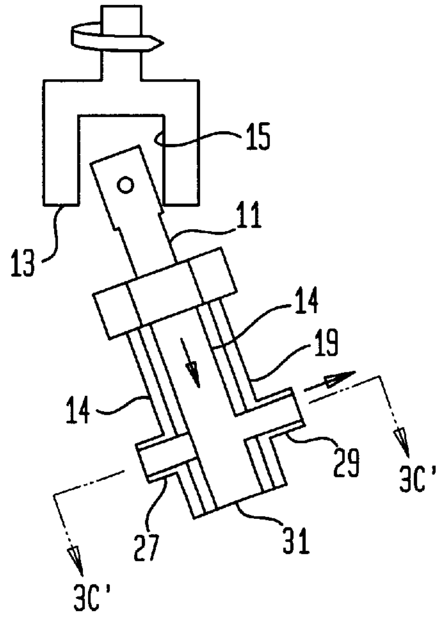
Figure 3C:
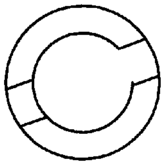

FIG. 3A displays the suction stroke. As suction is created the piston is pulled back in a manner opening inlet port 27 allowing fluid into pump chamber 31. When the piston reaches its highest point in the reciprocation cycle, pump chamber 31 is oriented at its maximum volume capacity. Continued rotation seals inlet port 27 as shown in FIG. 3B, the crossover point. Now that the inlet port 27 is sealed and the pump chamber full, the outlet port 29 opens. Only one port is open at any time and at no time are both ports interconnected. FIG. 3C defines the discharge stroke. Here through continuing rotation and reciprocation, the piston is forced down and results in opening of the outlet port 29. Discharge is created and fluid is pumped out. The piston bottoms for maximum fluid and bubble clearing. It is this feature of bubble clearing which renders the system ideal for accuracy and delivery of exact cosmetic chemical component to the formula receiving containers.

Figure 3D:
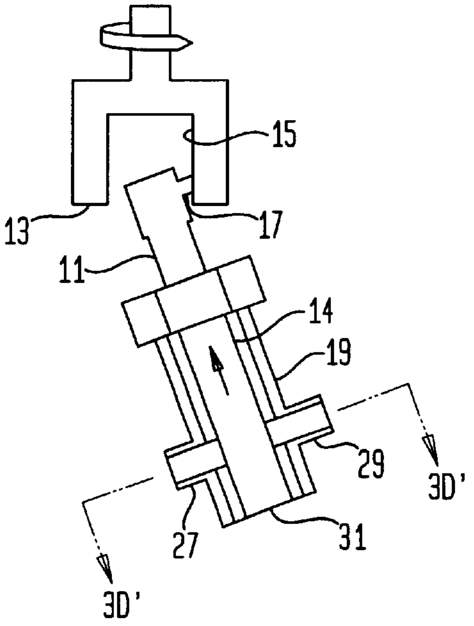
Figure 3D:
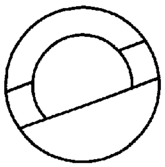

Further rotation causes the outlet port to be sealed resulting in a second crossover point shown by FIG. 3D. As the outlet port 29 is sealed and the pump chamber emptied, the inlet port 27 opens to start another suction stroke. Again, only one port is open at any time and at no time are both ports interconnected.

Another important feature of the system is instant reversibility of the stroke. Reversibility results from clockwise movement changing over to counterclockwise movement by adjusting the electrical phase of the motor.

A programmable logic controller 26 is positioned within housing 1 to receive operating instructions for dispensing the optimal formula corresponding to a customer's skin properties (e.g. skin shade). These operating instructions can be delivered electronically via a device that measures a customer's specific skin requirements or via mechanical input from a human expert assigning an optimal corresponding formula. The programmable logic controller 26 is electronically connected to a series of control relays 28 that activate movement of pumps 21–25. Motor 30 provides mechanical energy to operate valves associated with various feed lines.

Advantageously, conduits 32 connecting reservoirs 21'–25' with their respective pumps 21–25 will have a larger flow diameter than that of outlet manifolds 34 downstream from respective outlet ports 29 of each pump and forming the respective dispensing nozzles 10. Plastic or metal conduits and manifolds may be suitable. Useful metal construction may be that of copper, stainless steel or aluminum. Plastics which may be employed include polyvinyl chloride (e.g. Tygon® from Dupont), polyethylene, polyester or other non-reactive plastic tubing. Inlet conduit to outlet manifold diameters may be in a ratio from about 1:10 to about 0.9:1, preferably from about 1:5 to about 1:2, optimally from about 1:4 to about 1:3. Typical inlet conduit and outlet manifold flow diameters are 3 mm and 0.8 mm, respectively. Narrower diameters on the dispensing side of the pump avoid cavitation. Furthermore, the narrower diameters reduce volume needed to be purged between the different sample preparations.

A further advantage of this invention can be achieved through use of a collapsible pouch as a dispensing reservoir 21'–25'. These pouches will not have air vents. Air has a tendency to decompose the cosmetic chemical compositions, or at least some of their ingredients. Air can also cause microbial contamination. Suitable pouches for this purpose are available from Baxter Corporation in the form of a flexible "blood bag". Other collapsible pouches are available from Hedwin Corporation which are characterized by a cubic or rectangular shaped low density polyethylene walled container sealed diagonally along four sides, the seal forming a relatively rigid frame around which the walls may collapse.

FIG. 2 illustrates the temperature regulating system within the housing 1. This system consists of a cooling fan 38 and heater 40 which are regulated by a temperature controller (thermocouple). Temperature is best maintained between 20 and 27° C., preferably between 22 and 24° C., to achieve uniform viscosity of the liquid cosmetic compositions; changes in viscosity may bring about different dosing speeds thereby altering the accuracy of the dosed formula.

Also within housing 1 is a mechanism 42 for diagnosing and reporting any failure to deliver proper amounts of the dosed compositions to the container. A telemodem 48 is present within the housing for transmitting a failure diagnosis report generated by mechanism 42 via telephone linkage to a central monitoring station remote from the formulation unit. A further function of telemodem 48 is transmission of data concerning cosmetic composition usage, customer identification with a respective optimal skin corresponding formula and related data.

The foregoing description and examples illustrate selected embodiments of the present invention. In light thereof variations and modifications will be suggested to one skilled in the art, all of which are within the spirit and purview of this invention.

What is claimed is:

1. An apparatus for customizing a personal care product at point of sale to a customer, the apparatus comprising:

(i) a program for receiving external information on at least one of the customer's skin properties and converting the information to a corresponding formula; and (ii) a formulation unit for preparing the corresponding formula comprising:

(a) a mechanism for receiving the corresponding formula as a set of operating instructions;

(b) a plurality of reservoirs each containing a different cosmetic chemical composition;

(c) a plurality of pumps, each of the plurality of pumps includes:

an inlet port;

an outlet port; and a conduit adjacent the inlet port of each pump and having a larger diameter than a manifold downstream from the outlet port of each pump, with each pump communicating with one of the reservoirs and having a piston operating with reciprocating and rotating motion; and (d) a mechanism for activating the plurality of pumps resulting in dosing to a common dosing chamber of certain of the cosmetic chemical compositions and in certain amounts as determined by the operating instructions.

2. The apparatus according to claim 1 wherein the at least one of the customer's skin properties is that of color.

3. The apparatus according to claim 1 wherein the plurality of pumps are valveless, positive displacement metering pumps employing pistons rotating and reciprocating within a mated cylinder bore.

4. The apparatus according to claim 1, wherein, for each pump, diameters associated with the inlet conduit and the outlet manifold are in a ratio ranging from about 1:10 to about 0.9:1.

5. The apparatus according to claim 4 wherein, for each pump, the ratio of the diameters of the inlet conduit to outlet manifold ranges from about 1:5 to about 1:2.

6. The apparatus according to claim 1 wherein the plurality of reservoirs are collapsible containers.

7. The apparatus according to claim 1 wherein the different cosmetic chemical compositions each have a different color.

8. The apparatus according to claim 2 wherein the different cosmetic chemical compositions are four in number each having a different color.

9. A method for customizing a cosmetic product at point of sale to a customer is provided wherein the method comprises the steps of:

(i) obtaining information on at least one of the customer's skin properties;

(ii) transmitting the information to a program for conversion to a corresponding formula;

(iii) transferring the corresponding formula to a formulation unit for preparing the formula, the unit having a mechanism for converting the corresponding formula into a set of operating instructions, a plurality of reservoirs each containing a different cosmetic chemical composition and a plurality of pumps, each of the plurality of pumps including:

an inlet port;

an outlet port; and a conduit adjacent the inlet port of each pump and having a larger diameter than a manifold downstream from the outlet port of each pump, with each pump communicating with one of the reservoirs and having a piston operating with reciprocating and rotating motion;

(iv) activating the plurality of pumps based on the set of operating instructions to dose certain of the cosmetic chemical compositions in certain amounts as determined by the operating instructions; and (v) receiving the dosed cosmetic chemical compositions in a receiving container.

* * * * *